Feb. 16, 1926.                                           1,573,508
G. AUSTIN ET AL
ELECTRIC MOTOR FOR USE ON A CONSTANT CURRENT VARIABLE VOLTAGE SYSTEM
Filed Oct. 10, 1924       4 Sheets-Sheet 1

INVENTORS:
GILBERT AUSTIN,
JAMES COLQUHOUN MACFARLANE, AND
WILLIAM ALLAN MACFARLANE.
By John B. Brady Attorney.

Feb. 16, 1926.  
G. AUSTIN ET AL  
1,573,508  
ELECTRIC MOTOR FOR USE ON A CONSTANT CURRENT VARIABLE VOLTAGE SYSTEM  
Filed Oct. 10, 1924  
4 Sheets-Sheet 2
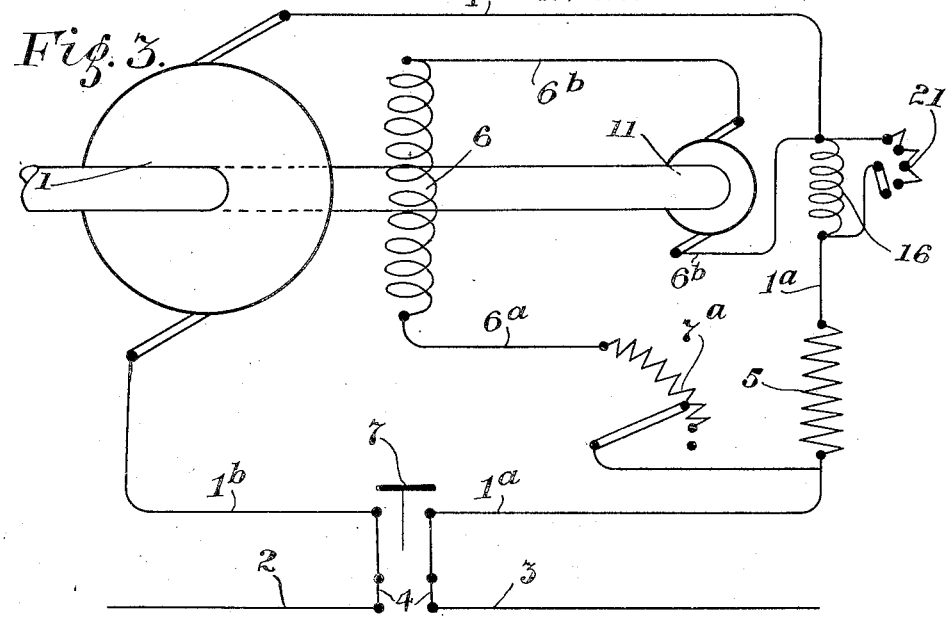
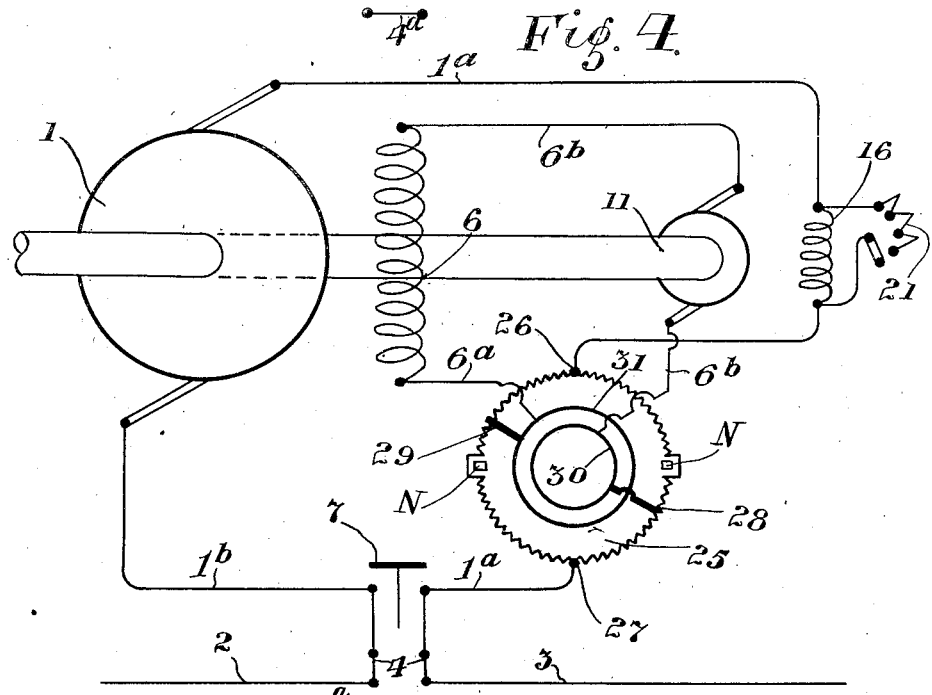
INVENTORS:
GILBERT AUSTIN,
JAMES COLQUHOUN MACFARLANE, AND
WILLIAM ALLAN MACFARLANE.
By John B Brady,
Attorney.

Feb. 16, 1926. 1,573,508
G. AUSTIN ET AL
ELECTRIC MOTOR FOR USE ON A CONSTANT CURRENT VARIABLE VOLTAGE SYSTEM
Filed Oct. 10, 1924    4 Sheets-Sheet 3

INVENTORS:
GILBERT AUSTIN,
JAMES COLQUHOUN MACFARLANE, AND
WILLIAM ALLAN MACFARLANE.
By John B Brady
Attorney.

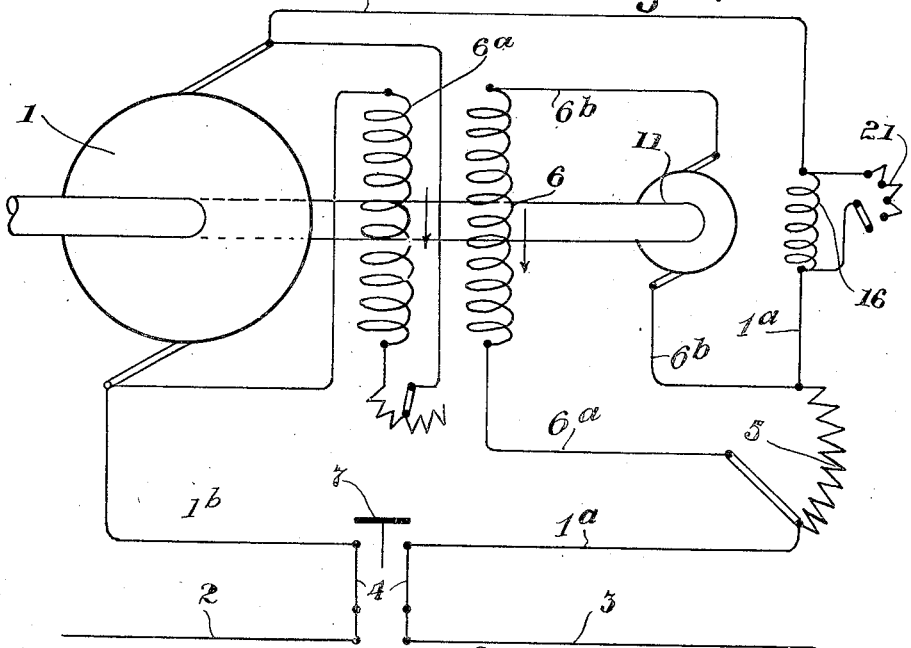
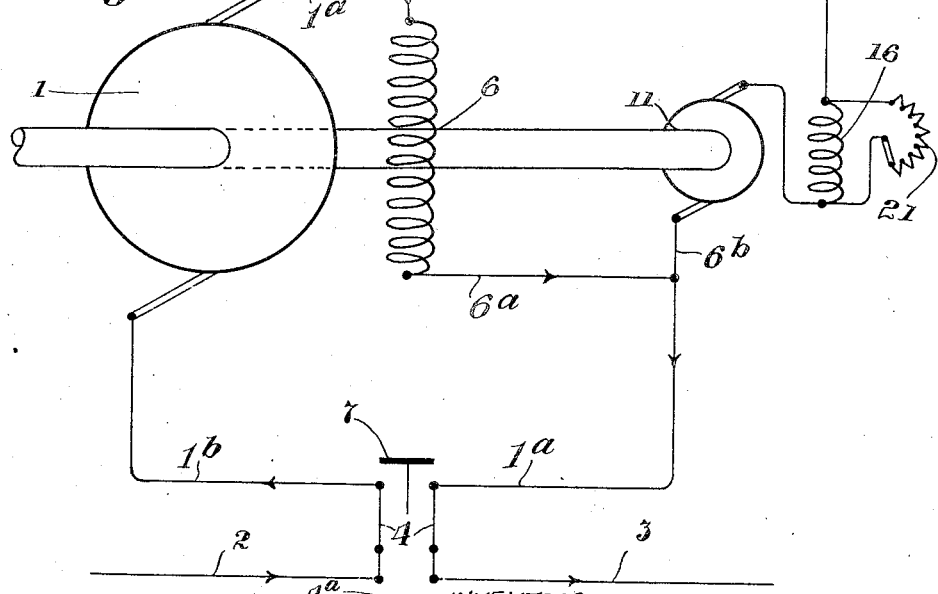

Patented Feb. 16, 1926.

1,573,508

UNITED STATES PATENT OFFICE.

GILBERT AUSTIN, JAMES COLQUHOUN MACFARLANE, AND WILLIAM ALLAN MACFARLANE, OF GLASGOW, SCOTLAND.

ELECTRIC MOTOR FOR USE ON A CONSTANT-CURRENT VARIABLE-VOLTAGE SYSTEM.

Application filed October 10, 1924. Serial No. 742,377.

*To all whom it may concern:*

Be it known that we, GILBERT AUSTIN, 10 Calderwood Road, Newlands, Glasgow, Scotland, JAMES COLQUHOUN MACFARLANE, Braehead, Cathcart, Glasgow, Scotland, and WILLIAM ALLAN MACFARLANE, Alderwood, Cathcart, Glasgow, Scotland, subjects of the King of Great Britain, have invented certain new and useful Improvements in or Relating to Electric Motors for Use on a Constant-Current Variable-Voltage System, of which the following is a specification.

The present invention concerns improvements in or relating to electric motors for use on the constant current variable voltage system. Motors for operating on this system produce constant torque, and if uncontrolled, would rise to dangerous speeds; the regulation of the speed is usually effected by shifting the brushes on the commutator to a position giving more or less torque as necessary.

The object of the present invention is to provide, for use on such a system, motors having fixed brushes, which motors will automatically give, above normal speed, torque-speed characteristics equivalent, as may be desired, to a series, shunt or compound wound motor operating on the parallel system.

According, therefore, to the present invention there is combined with an electric motor having fixed brushes for use on a constant current variable voltage system, a dynamo electric machine (hereinafter referred to as a regulator) having its armature driven mechanically from the motor and connected in series with the motor field winding and so arranged that the current produced thereby will oppose the current in the motor field winding circuit, and having its field in series with the motor armature; preferably the regulator armature is mounted upon the motor shaft so as to rotate therewith. The current in the motor field circuit may be derived from the main line circuit by connecting it across a resistance in the latter circuit, the said resistance having a suitable potential difference between its ends, or it may be derived from a separate source of supply having constant voltage. In the first case the regulator field may form part of the said resistance and a separate potentiometer may be coupled as a shunt across this resistance, the derived circuit being connected across a suitable part of this separate potentiometer.

The various features of the invention will now be described with reference to the accompanying drawings but it is to be understood that this is by way of exemplification and not of limitation.

In the drawings:—

Figs. 2 to 8 are diagrams of modified connections.

Figure 1:
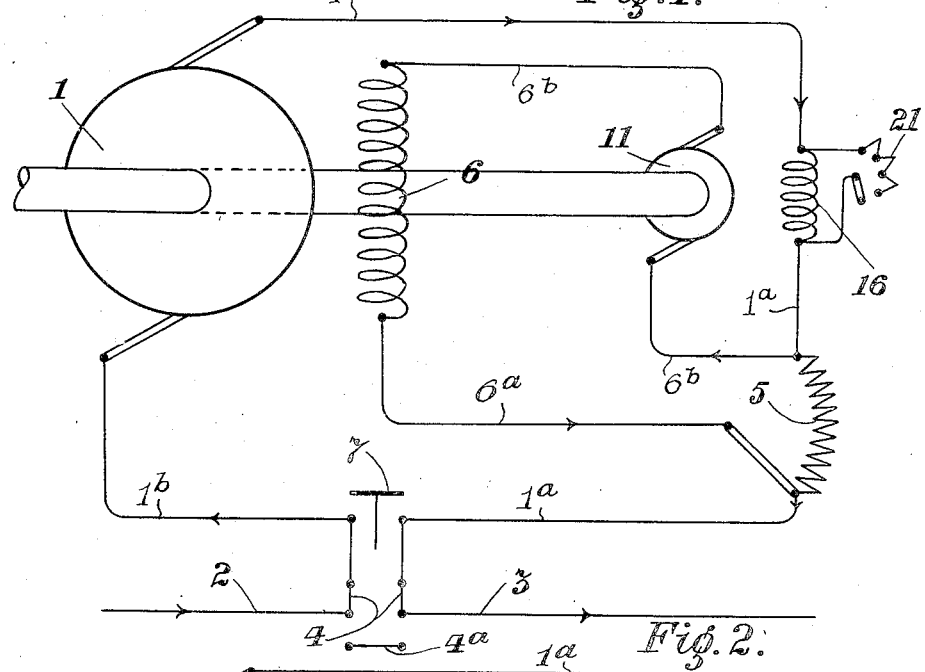
Fig. 1 is a diagram of the connections of a motor and its associated parts.

Referring first to Fig. 1, the motor is of standard construction and has fixed brushes and, if desired, may have interpoles. Its armature 1 is connected by the conductors $1^a$, $1^b$ in series with the main line 2, 3 and is adapted to be cut out by the main switch 4 which completes the line through the by-pass $4^a$, before disconnecting the motor from the line. Upon an extension of the motor shaft there is mounted the armature of a small dynamo electric machine, the latter being hereinafter referred to as the regulator. A neutral point contactor 7 is provided to short the connection between the parts 2 and 3 of the line; it is operated mechanically and automatically by or from the control lever of the control resistance or potentiometer (to be described) when the said lever is moved to change the position of the contacts, the arrangement being such that when the potentiometer is in neutral position the motor is short circuited.

The main line current is arranged to flow in series through the motor armature 1 and the field winding 16 of the regulator.

Figure 2:
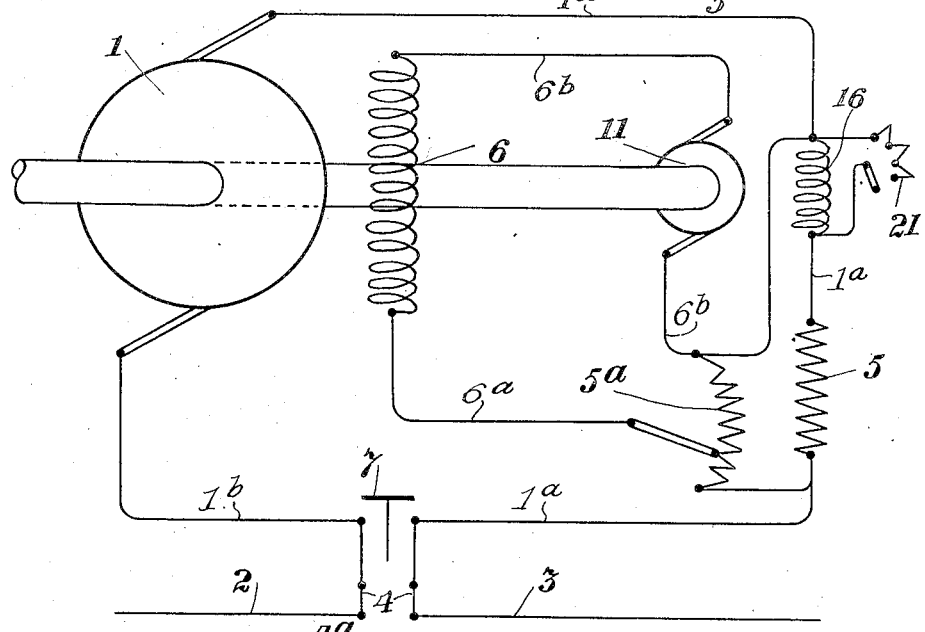

The field winding 6 of the motor is separately excited, and this exciting current may be derived from the main line circuit by suitable conducting means, for instance, the conductors $6^a$, $6^b$ which conductors are connected as a shunt to the said main line circuit across a resistance 5 inserted in the main circuit. This resistance 5 may be used directly as a potentiometer regulator as in Fig. 1; or it may be a fixed resistance, or a portion of the main circuit containing a resistance sufficient to provide the necessary pressure drop (such as a field winding or brake magnet coil), and a separate potentiometer regulator may then be connected as a shunt to that portion of the main line containing such resistance, see Fig. 2. This construction reduces the current passing through the winding 16 at starting, thus weakening the field in which the armature 11 revolves and so delaying the rise of the reverse voltage produced by this armature until the motor is well started.

Should it be convenient the excitation current may be taken from some independent source of constant potential.

The motor field winding 6 is connected as a shunt to the resistance 5 (Fig. 1) or potentiometer 5ª (Fig. 2), and the armature 11 of the regulator is inserted in series with this derived circuit and is so connected that its voltage opposes that which feeds the exciting circuit. The line current will divide at one terminal of the resistance between the two circuits and will unite at the other terminal thereof; at zero speed the line current will divide in proportion to the conductivity of the two circuits and under this condition with full field on the motor winding 6 and full line current through the armature 1, the motor torque will be a maximum.

As the motor revolves, the regulator armature 11 will produce an E. M. F. opposing that appearing at the terminals of the potentiometer and therefore the motor field flux will be correspondingly reduced and with it the torque, more and more, as speed increases until the reverse voltage produced by the regulator rises to almost the same value as that at the terminals of the potentiometer, when the speed will be a maximum and the torque a minimum, thus producing a result similar to that produced by a series motor operated on the parallel system.

The torque-and-speed curve may be varied according to the degree of saturation adopted in the motor design.

Up to this point both the motor and the regulator have been worked as motors, and, while a small amount of energy is wasted in heat at the resistance or potentiometer, some of the energy in the derived circuit reappears as torque due to the regulator. Should the motor be driven, as for example by a falling load, so that the reverse voltage of the regulator armature 11 rises beyond the voltage across the potentiometer terminals, then the motor field current and therefore the polarity of the motor will be reversed, and it will become a generator and will add voltage to the line. The regulator likewise acts as a generator, raising the voltage across that part of the potentiometer in circuit with its armature and increasing the current through that part.

If it is desired to permit a higher normal motor speed than that which could be attained under the conditions just described but with similar torque-speed characteristics, this can be done in two ways—

(1) By diverting some of the current from the regulator field winding 16 through an adjustable by-pass 21; this will reduce the regulator field flux and therefore the regulator voltage and consequently more current will flow in the motor field from the potentiometer or other source of supply. The zero-torque condition will then be reached at a higher speed.

(2) By increasing the resistance of the potentiometer, which would have the same effect as increasing the motor field flux and therefore the torque. This method is a convenient one for increasing the starting torque.

Referring now to Fig. 3, the torque and the speed of the motor may alternatively be adjusted by means of a small adjustable resistance 7ª inserted in the derived circuit.

Referring to Fig. 4, the potentiometer 25 is inserted in the main line circuit, being connected thereto at the terminals 26 and 27 so that it is divided into two parallel portions; the contact brushes 28 and 29 connect the rings 30 and 31 to the studs of the potentiometer. The rings 30 and 31 are connected respectively to the armature 11 of the regulator and the field winding 6 of the motor so that the armature 11 and winding 6 are in series across these two rings. NN are two neutral studs, and when the contact brushes 28, 29 are upon these studs, there will be no potential difference between the rings or bars and therefore no current will flow in the derived circuit and consequently there will be no torque on the motor; but on sliding the contact brushes in one direction a potential difference between the rings will be produced and a corresponding current and flux will be produced in the field winding 6 so that the motor will rotate, its speed being determined by the position of the contact brushes and being varied, as desired, (by changing the position of the brushes) from no-speed to the maximum arranged for on the potentiometer. It will, of course, be understood that if the contact brushes are moved in the reverse direction from mid-position the polarity of the rings and therefore the field current of the motor will be reversed and consequently the motor will rotate reversely.

Figure 5:
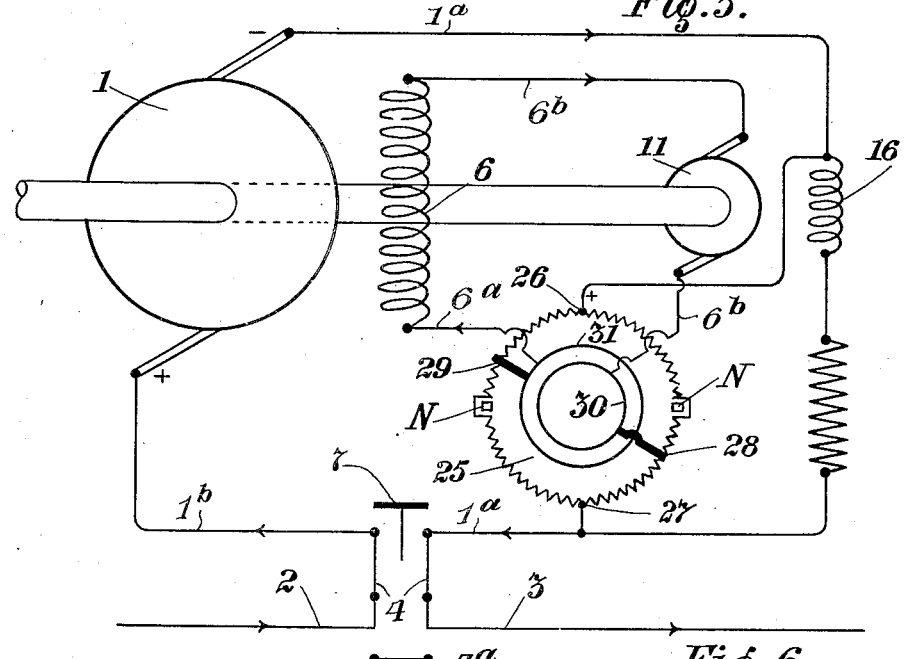

Fig. 5 shows a potentiometer similar to that in Fig. 4 but connected as a shunt to the main line circuit.

Figure 6:
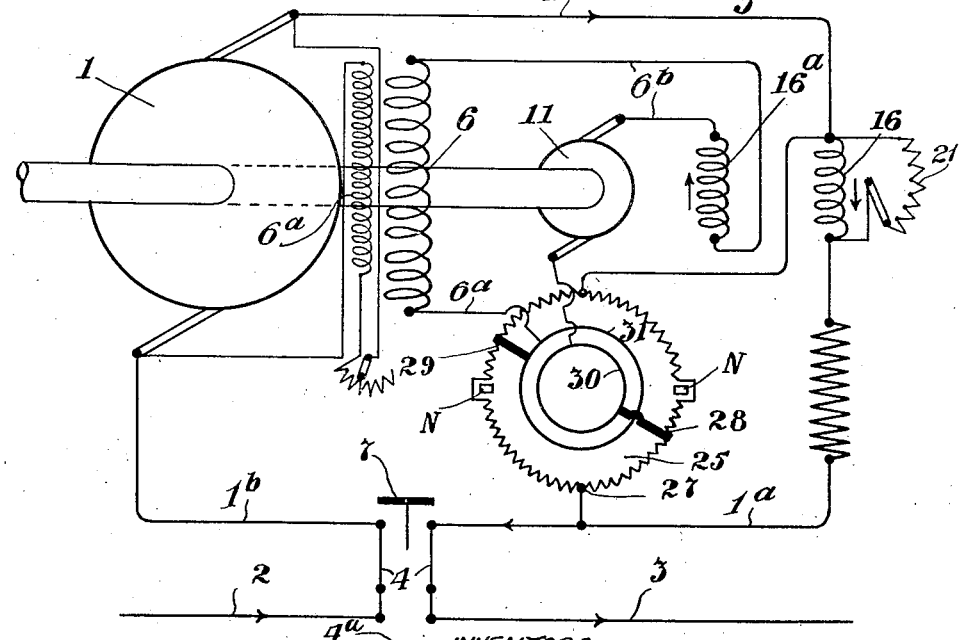

Referring now to Fig. 6, if it is desired to provide a motor which will maintain full torque from zero speed over a wide range, or which will give any special torque-speed characteristic, as for instance one similar to that of a compound motor on the parallel system, the regulator may be provided with an additional field winding 16ª coupled in series with the regulator armature 11 and with the motor field 6, and so connected as to oppose the flux produced in the regulator main field winding 16. When, therefore, the motor is revolving at low speed and the current in the derived circuit is large, the flux of the regulator field is kept at a low value, thus permitting large torque on the motor shaft and maintaining this torque until high speed is attained. When, however, the current in the derived circuit begins to alter as the speed increases there is a twofold effect operating to limit the speed:—

(*a*) The voltage of the regulator in opposition to that of the potentiometer rises, due to the increase in speed of the regulator armature.

(*b*) The flux of the regulator field is increased, due to the reduction of the opposing current in the subsidiary field winding consequent upon the increase in the E. M. F. generated by the regulator armature because of its increase in speed.

The torque-and-speed characteristic of the motor may be further modified, for any special purpose, by applying any of the well-known methods of field windings, such for example as putting an extra winding on the motor or regulator fields coupled in shunt to either of the armatures. Such an arrangement is shown in Fig. 7 where the additional field winding 6ª is added to the motor field, being coupled in shunt to the motor armature 1 and being so connected as to assist the winding 6.

It will be obvious that the exciting circuit may be derived from a separate source of constant voltage supply instead of from the fall of potential in a portion of the main line as described, and the potentiometer and regulator will operate in exactly the same manner.

According to a further modification the connections of the various parts may be as shown in Fig. 8. For the purpose of this invention the regulator armature 11 is in series both with its own field 16 and the motor field 6, the armature 11 being so connected as to assist the main line current flowing through it and to oppose the current which would naturally flow through the field winding 6. Therefore as the speed rises, the E. M. F. of the armature 11 will increase and will tend to increase the current flowing through itself so providing an easier path through itself than through the field winding 6 and so reducing the current which would otherwise flow through the field winding 6. Thus the armature 11 and field 6 and 16 are in series with one another and form a local circuit inserted in the main line circuit in series with the motor armature 1.

It will be seen from the foregoing that by any suitable combination such as those described and by a proper adjustment of the values of the field E. M. F.'s, a motor can be made to give a wide range of torque-speed characteristics and, the line current being steady, the motor can be stalled under any condition without damage to its windings.

Having now fully described our invention what we claim and desire to secure by Letters Patent is:—

1. In combination, an electric motor having armature and field windings and having fixed brushes for use on a constant current variable voltage system; conductors for connecting a main line circuit to said motor; a resistance in said conductors; means for connecting the motor field windings across said resistance; a dynamo electric machine having its armature windings connected in series with the field winding of the motor and so arranged that the current produced thereby will oppose the current in the motor field winding circuit, and having its field winding in series with the motor armature; and means for mechanically driving the armature of said dynamo electric machine from the motor.

2. In combination, an electric motor having armature and field windings and having fixed brushes for use on a constant current variable voltage system; conductors for connecting a main line circuit to said motor; a dynamo electric machine having its armature windings connected in series with the field winding of the motor and so arranged that the current produced thereby will oppose the current in the motor field winding circuit, and having its field winding in series with the motor armature; a resistance in said conductors and in series with the field winding of the dynamo, a potentiometer connected as a shunt across said resistance and said dynamo field windings; means for connecting the motor field winding and dynamo armature windings across said potentiometer; and means for mechanically driving the armature of said dynamo electric machine from the motor.

3. In combination, an electric motor having armature and field windings and having fixed brushes for use on a constant current variable voltage system; conductors for connecting a main line circuit to said motor; a dynamo electric machine having its armature windings connected in series with the field winding of the motor and so arranged that the current produced thereby will oppose the current in the motor field winding circuit, and having its field winding in series with the motor armature; an adjustable by-pass across said dynamo field winding; a resistance in said conductors and in series with the field winding of the dynamo, said dynamo field windings forming part of said resistance; a potentiometer connected as a shunt across said resistance and said dynamo field windings; means for connecting the motor field winding and dynamo armature windings across said potentiometer; and means for mechanically driving the armature of said dynamo electric machine from the motor.

4. In combination, an electric motor having armature and field windings and having fixed brushes for use on a constant current variable voltage system; conductors for connecting a main line circuit to said motor; a dynamo electric machine having its armature windings connected in series with the field winding of the motor and so arranged that the current produced thereby will oppose the current in the motor field winding circuit, and having its field winding in series with the motor armature; a potentiometer having two parallel portions between said conductors and the field winding of the dynamo; means for connecting the motor field winding and dynamo armature windings across said potentiometer; and means for mechanically driving the armature of said dynamo electric machine from the motor.

5. In combination, an electric motor having armature and field windings and having fixed brushes for use on a constant current variable voltage system; conductors for connecting a main line circuit to said motor; a dynamo electric machine having its armature windings connected in series with the field winding of the motor and so arranged that the current produced thereby will oppose the current in the motor field winding circuit, and having its field winding in series with the motor armature; a resistance in said conductors and in series with the field winding of the dynamo, said dynamo field winding forming part of said resistance; a potentiometer having two parallel portions connected as a shunt to the resistance; means for connecting the motor field winding and dynamo armature windings across said potentiometer; and means for mechanically driving the armature of said dynamo electric machine from the motor.

6. In combination, an electric motor having armature and field windings and having fixed brushes for use on a constant current variable voltage system; a dynamo electric machine having its armature windings connected in series with the field winding of the motor and so arranged that the current produced thereby will oppose the current in the motor field winding circuit; and having its field winding in series with the motor armature; an additional field winding on the dynamo connected in series with the dynamo armature winding and the motor field winding and arranged to oppose the flux produced by the main field winding of the dynamo; and means for mechanically driving the armature of said dynamo electric machine from the motor.

7. In combination, an electric motor having armature and field windings and having fixed brushes for use on a constant current variable voltage system; an additional field winding on the motor connected across the armature circuit and arranged to assist the motor field winding; a dynamo electric machine having its armature windings connected in series with the first mentioned field winding of the motor and so arranged that the current produced thereby will oppose the current in the motor field winding circuit, and having its field winding in series with the motor armature; and means for mechanically driving the armature of said dynamo electric machine from the motor.

In testimony whereof we affix our signatures.

GILBERT AUSTIN.
JAMES COLQUHOUN MACFARLANE.
WILLIAM ALLAN MACFARLANE.